(12) United States Patent
Pelger et al.

(10) Patent No.: US 11,302,944 B2
(45) Date of Patent: Apr. 12, 2022

(54) METHOD AND MOTOR VEHICLE FOR SUPPLYING AT LEAST ONE FUEL CELL WITH FUEL

(71) Applicant: Bayerische Motoren Werke Aktiengesellschaft, Munich (DE)

(72) Inventors: Andreas Pelger, Ismaning (DE); Stefan Schott, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 224 days.

(21) Appl. No.: 16/383,189

(22) Filed: Apr. 12, 2019

(65) Prior Publication Data
US 2019/0237786 A1  Aug. 1, 2019

Related U.S. Application Data

(63) Continuation of application No. PCT/EP2017/075337, filed on Oct. 5, 2017.

(30) Foreign Application Priority Data

Oct. 13, 2016 (DE) .................. 10 2016 219 958.7

(51) Int. Cl.
H01M 8/04992 (2016.01)
B60L 50/70 (2019.01)
(Continued)

(52) U.S. Cl.
CPC ......... *H01M 8/04992* (2013.01); *B60L 50/70* (2019.02); *B60L 58/30* (2019.02);
(Continued)

(58) Field of Classification Search
CPC ......... H01M 8/04992; H01M 8/04604; H01M 8/04686; H01M 8/04425; H01M 8/04089;
(Continued)

(56) References Cited

U.S. PATENT DOCUMENTS 7,270,902 B2  9/2007  Suzuki
7,377,345 B2  5/2008  Hasuka et al.
(Continued)

FOREIGN PATENT DOCUMENTS

DE          103 32 129 A1    2/2004
DE    10 2005 027 651 A1    12/2006
(Continued)

OTHER PUBLICATIONS

PCT/EP2017/075337, International Search Report dated Dec. 6, 2017 (Two (2) pages).
(Continued)

Primary Examiner — Matthew W Van Oudenaren
(74) Attorney, Agent, or Firm — Crowell & Moring LLP

(57) ABSTRACT

A method for supplying at least one fuel cell of a fuel cell system of the motor vehicle with fuel includes ascertaining or predicting an indication value which is indicative of the real and/or possible mass flow of the withdrawal of fuel from a pressure-vessel system of the motor vehicle and closing at least one tank shut-off valve when the indication value is equal to or falls below a limiting value.

10 Claims, 1 Drawing Sheet

(51) Int. Cl.
- *B60L 58/30* (2019.01)
- *H01M 8/04082* (2016.01)
- *H01M 8/04089* (2016.01)
- *H01M 8/0432* (2016.01)
- *H01M 8/0438* (2016.01)
- *H01M 8/04537* (2016.01)
- *H01M 8/04746* (2016.01)
- *H01M 8/04664* (2016.01)
- *B60L 58/32* (2019.01)

(52) U.S. Cl.
CPC ......... *B60L 58/32* (2019.02); *H01M 8/04089* (2013.01); *H01M 8/04201* (2013.01); *H01M 8/04373* (2013.01); *H01M 8/04388* (2013.01); *H01M 8/04425* (2013.01); *H01M 8/04604* (2013.01); *H01M 8/04611* (2013.01); *H01M 8/04686* (2013.01); *H01M 8/04753* (2013.01); *B60L 2240/36* (2013.01); *B60Y 2200/91* (2013.01); *B60Y 2400/202* (2013.01); *H01M 2250/20* (2013.01); *Y02T 90/40* (2013.01)

(58) Field of Classification Search
CPC ......... H01M 8/04201; H01M 8/04611; H01M 8/04373; H01M 8/04388; H01M 8/04753; H01M 2250/20; H01M 8/04328; H01M 8/04447; H01M 8/04798; H01M 8/04671; H01M 8/04679; B60L 58/30
See application file for complete search history.

(56) References Cited

U.S. PATENT DOCUMENTS

| | | | | |
|---|---|---|---|---|
| 2004/0161643 | A1* | 8/2004 | Uehara | H01M 8/04089 429/443 |
| 2006/0286419 | A1* | 12/2006 | Binder | H01M 8/04313 429/430 |
| 2007/0264546 | A1* | 11/2007 | LaVen | H01M 16/006 429/416 |

FOREIGN PATENT DOCUMENTS

| | | |
|---|---|---|
| DE | 10 2016 215 323 A1 | 2/2018 |
| EP | 2 228 860 A1 | 9/2010 |
| FR | 2 986 109 A1 | 7/2013 |
| FR | 2986109 * | 7/2013 |

OTHER PUBLICATIONS

German Search Report issued in German counterpart application No. 10 2016 219 958.7 dated Sep. 7, 2017, with Statement of Relevancy (Nine (9) pages).

Commission Regulation (EU) No. 406/2010 of Apr. 26, 2010 for implementing Regulation (EC) No. 79/2009 of the European Parliament and of the Council on type-approval of hydrogen-powered motor vehicles, 107 total pages.

\* cited by examiner

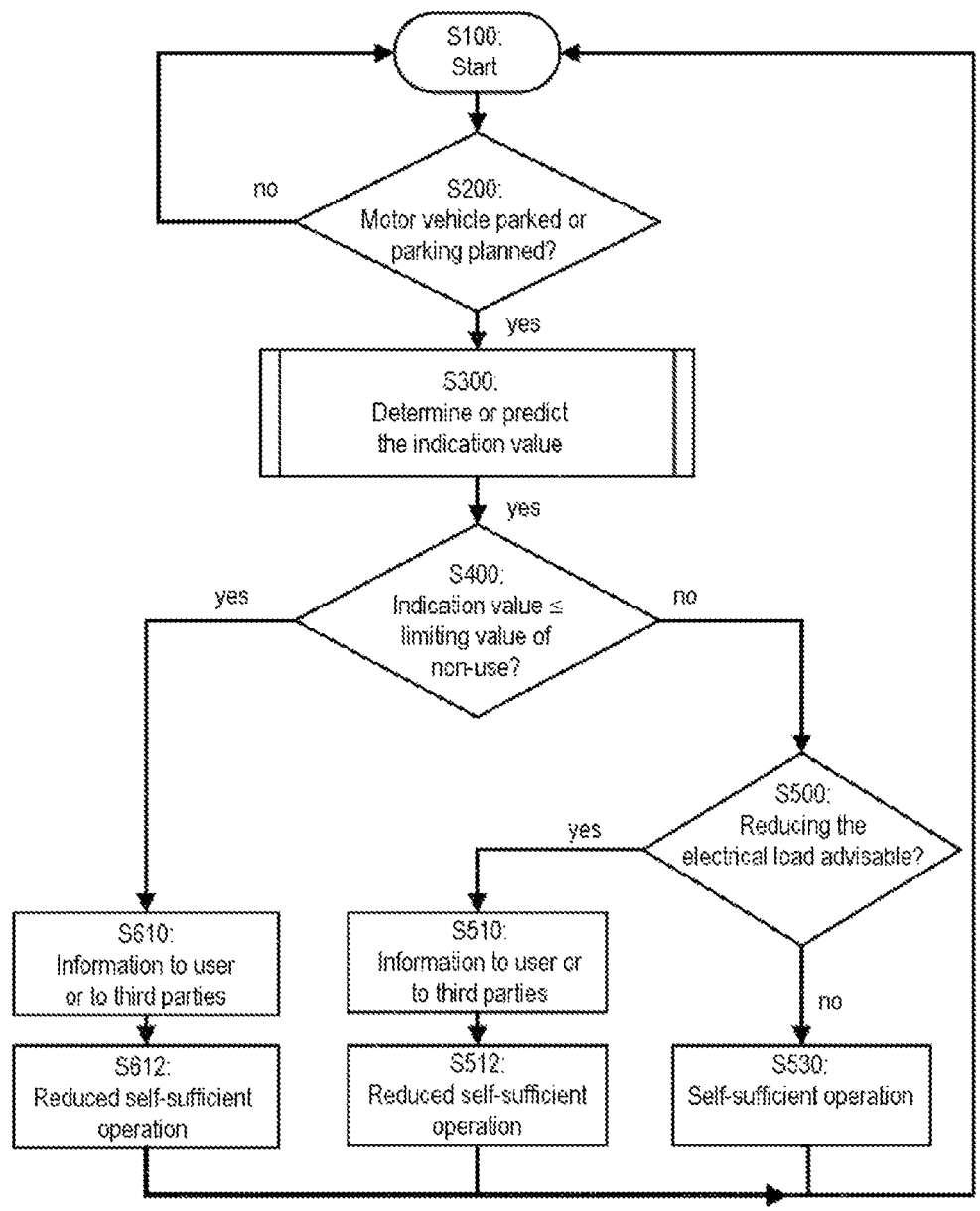

METHOD AND MOTOR VEHICLE FOR SUPPLYING AT LEAST ONE FUEL CELL WITH FUEL

CROSS REFERENCE TO RELATED APPLICATIONS

This application is a continuation of PCT International Application No. PCT/EP2017/075337, filed Oct. 5, 2017, which claims priority under 35 U.S.C. § 119 from German Patent Application No. 10 2016 219 958.7, filed Oct. 13, 2016, the entire disclosures of which are herein expressly incorporated by reference.

BACKGROUND AND SUMMARY OF THE INVENTION

The technology disclosed herein relates to a method for supplying at least one fuel cell of a fuel-cell system of a motor vehicle with fuel. The technology disclosed herein further relates to a motor vehicle with a fuel-cell system.

Fuel-cell electric vehicles as such are known. In regular operation of the motor vehicle a minimum mass flow of fuel is necessary, in order that the fuel-cell system can be operated stably. If this minimum mass flow is no longer provided, the fuel cell cannot be operated properly.

It is a preferred object of the technology disclosed herein to lessen or to eliminate at least one disadvantage of the previously known solutions. In particular, it is an object of the technology disclosed herein to provide a mass flow of fuel during the phase of use, and during the non-use, of the motor vehicle in such a manner that no impairment of the fuel-cell system occurs. Further preferred objects may arise out of the advantageous effects of the technology disclosed herein.

The technology disclosed herein relates to a method for supplying at least one fuel cell of a fuel-cell system of a motor vehicle—in particular, the motor vehicle disclosed herein and the fuel-cell system disclosed herein—with fuel.

The method disclosed herein includes the following step:

ascertaining or predicting an indication value that is indicative of the real and/or possible or potential mass flow of the withdrawal of fuel from a pressure-vessel system of the motor vehicle.

The supply of the at least one fuel cell of the fuel-cell system may expediently be effected by taking into consideration the ascertained or predicted indication value and the limiting values disclosed below (for example, limiting value of non-use, limiting value of use).

The method disclosed herein may include the following steps:

closing at least one tank shut-off valve when the indication value is equal to or falls short of a (lower) limiting value, and/or outputting an item of information if the ascertained and/or predicted indication value is equal to or falls short of a limiting value.

For instance, the indication value may correlate directly with the mass flow of the withdrawal of fuel. The mass flow of the withdrawal of fuel is the mass flow that the pressure-vessel system provides to the anode feed line or to the fuel-cell stack. To the extent that several pressure vessels are being employed, the mass flow of the withdrawal of fuel is expediently the mass flow capable of being maximally provided that the several pressure vessels forming the pressure-vessel system are able to provide ultimately to the fuel-cell stack.

The mass flow of the withdrawal of fuel can, for instance, be ascertained from the pressure difference between the internal pressure of the pressure vessel and the pressure at the fuel-cell stack in conjunction with the temperature. It is just as conceivable that the mass flow of the withdrawal of fuel is ascertained otherwise. For instance, it is conceivable that the speed and the density of the fuel are ascertained (for example, measured) during the withdrawal. From the product of these two physical quantities, the mass flow of the withdrawal of fuel then results. Alternatively or additionally, the mass flow of the withdrawal of fuel could be determined from the electrical power of the fuel cell that the latter provides during the operation of the fuel-cell system.

For the purpose of carrying out the method disclosed herein, as a rule it is sufficient to ascertain only an indication value that is indicative of the real and/or possible or potential mass flow of the withdrawal of fuel from a pressure-vessel system of the motor vehicle. For instance, the pressure at the fuel-cell stack can be regarded as constant and already known. For a fuel-cell system, a limiting value of an internal pressure of a pressure vessel can be ascertained by approximation, at which limiting value the fuel-cell system can still be operated stably with the mass flow of the withdrawal of fuel arising at this internal pressure of the pressure vessel. In this connection, the temperature in the pressure vessel can furthermore also be taken into consideration, as a result of which the accuracy improves. Alternatively, the density in the pressure vessel and the temperature in the pressure vessel could also be focused upon.

The limiting value in this case has been chosen in such a way that above the limiting value the pressure-vessel system is able to provide sufficient fuel to the fuel-cell stack for a stable operation of the fuel-cell system without impairments and, in particular, without bringing about irreversible damage to the fuel-cell system.

The method disclosed herein may further include the step according to which a fuel-cell system is shut down when the indication value is equal to or falls short of a lower limiting value.

If a minimum mass flow required for a stable operation of the fuel-cell system can no longer be provided by the at least one pressure vessel of the pressure-vessel system, the fuel-cell system is shut down, in which case the tank shut-off valve is closed in accordance with the technology disclosed herein. The fuel-cell system can firstly be shut down, and then the tank shut-off valve can be closed. Equally, the tank shut-off valve could also be closed during the shutting down of the fuel-cell system. As a rule, the consumption of fuel for shutting down is known. In this connection, the fuel-cell system is expediently switched off before an impairment of, or damage to, the fuel-cell system can occur. Consequently the probability of irreversible damage to the fuel-cell system can be reduced.

If a motor vehicle is not being operated, for instance during a lengthy parking event, the tank shut-off valve of the fuel-cell system is closed. During such an inactive phase of the motor vehicle there may be provision that fuel is to continue to be supplied to the fuel-cell stack of the anode subsystem, for instance in order to:

supply additional fuel to the anode compartment of the fuel-cell stack; and/or flush the moisture out of the system (conditioning) with the aid of fuel; and/or keep the system temperature at a certain level by operation of the fuel-cell system; and/or charge a high-voltage storage device at least partially; and/or condition a passenger compartment for an imminent journey.

For the purpose of providing fuel, it may be necessary that the tank shut-off valve has to be opened also during the non-use of the motor vehicle. It has been recognized by the inventors that the method disclosed herein for switching off the fuel-cell system safely may, under certain circumstances, impair the provision of fuel during an inactive phase of the motor vehicle. Now if the aforementioned limiting value for closing the at least one tank shut-off valve during the use of the motor vehicle has been implemented, it might happen that during a phase of non-use of the motor vehicle the at least one pressure vessel is unable to provide additional fuel to the fuel-cell system. This would be the case if the ascertained or predicted indication value were lower than the limiting value of the mass flow of the withdrawal of fuel. However, if the at least one pressure vessel is unable to supply additional or sufficient fuel to the anode subsystem, the fuel-cell stack could then possibly be damaged by reason of the lack of fuel during the phase of non-use of the motor vehicle or at the time of the subsequent starting of the motor vehicle. For example, the anode might then not be sufficiently pressurized with fuel in order that no oxygen penetrates, or insufficient fuel might be supplied to the anode in order to purge the product water out of the fuel-cell system at the time of cold shutdown (purge process). A phase of use of the motor vehicle is a phase in which a user of the motor vehicle is (actively) using the motor vehicle. So consequently, for instance, the operation of the motor vehicle by the user or (partly) autonomously.

A phase of non-use of the motor vehicle, however, is the inactive phase of the motor vehicle. In other words, the phase of non-use is, for instance, a (lengthy) time-interval during which the motor vehicle actively receives no instruction from the user that requires the operating of the fuel cell or of the motor vehicle. This is the case, for instance, when a motor vehicle has been parked. In this phase of non-use of the motor vehicle, however, self-sufficient operation of the fuel-cell system may occur, for instance in order to:

avoid or reduce irreversible damage to the fuel-cell system by virtue of certain fuel-consuming functions of the motor vehicle (protective functions); and/or prepare the motor vehicle for the next use of the motor vehicle by virtue of conditioning functions or comfort functions.

The limiting value provided during a phase of non-use of the motor vehicle is designated as the limiting value of non-use in the case of the technology disclosed herein. A limiting value for the phase of use of the motor vehicle is designated as the limiting value of use in the case of the technology disclosed herein.

According to the method disclosed herein, the limiting value of non-use of the motor vehicle is lower than the limiting value of use of the motor vehicle. So, in other words, during the phase of non-use of the motor vehicle a withdrawal from the at least one pressure vessel at lower mass flows of the withdrawal of fuel is still possible as during phases of use of the motor vehicle.

Consequently the probability can be reduced that during a phase of non-use of the motor vehicle the pressure-vessel system is unable to provide additional fuel to the fuel-cell system. In one configuration, the limiting value of non-use may have been chosen in such a way that a withdrawal of fuel is practically always possible. In another configuration, there may be provision that a certain minimum pressure is always provided in the pressure vessel for the purpose of protecting the pressure vessel.

The method disclosed herein further includes the step according to which the indication value of the real or possible mass flow of the withdrawal of fuel from the pressure-vessel system of the motor vehicle is predicted. The indication value is preferably predicted for the phase of non-use of the motor vehicle.

The prediction can be made, for instance, by taking into consideration the exchange of heat between the at least one pressure vessel of the pressure-vessel system and the environment of the motor vehicle during the phase of non-use of the motor vehicle. During the operation of the vehicle, the temperature of the at least one pressure vessel changes in relation to the environment. Now if the vehicle is parked, the tank shut-off valve is closed. During the phase of non-use, the temperature of the pressure vessel and of the fuel contained therein changes (as a rule, the pressure vessel and the fuel cool down). This change of temperature brings about a change of pressure in the pressure tank, which in turn influences the mass flow of the withdrawal of fuel. The heat-exchange processes occurring thereby and the associated change in the state variables of the fuel in the pressure vessel can be ascertained by experiments and thermodynamic model calculations.

Alternatively or additionally, the prediction may be made by taking into consideration the predicted consumption of fuel during the phase of non-use of the motor vehicle. On the basis of experiments, it can be ascertained how much fuel the fuel-cell system needs during the phase of non-use in order to avoid damage (in particular, irreversible damage). For instance, the predicted ambient temperatures and the predicted duration of the phase of non-use can also be taken into consideration in this process. The data needed for the prediction (for example, duration, external temperature, etc.) may originate from any source, for instance from the Internet or from calendar entries, etc.

The method disclosed herein may further include the step according to which an item of information is output to the user of the vehicle and/or to a third party if the ascertained and/or predicted indication value lies below the limiting value (of non-use). Such an item of information can, for instance, be transmitted via any type of wireless communication. If a predicted indication value is communicated early enough to the user or to a third party, suitable countermeasures can be adopted at an early stage. For instance, the user can refill the pressure vessel in timely manner.

The method may further include the step according to which at least one fuel-consuming function of the motor vehicle is deactivated during the non-use of the motor vehicle if the ascertained and/or predicted indication value lies below the limiting value of non-use or is approaching the limiting value of non-use. These fuel-consuming functions of the motor vehicle during the phase of non-use of the motor vehicle can be subdivided into:

protective functions which avoid or reduce damage (in particular, irreversible damage) to the fuel-cell system (for example, permanent pressurizing of the anode for the purpose of avoiding hydrogen fronts during cold starting); and further functions such as, for example, conditioning functions or comfort functions (for example, charging the high-voltage storage device or preconditioning the passenger compartment).

Particularly advantageously, at least one of the further functions is deactivated.

In other words, during the phase of non-use of the motor vehicle the electric current to be provided by the fuel-cell system can accordingly be decreased. The current to be provided can be decreased, by at least one electrical load and/or electrical storage device to be supplied by the fuel-cell system not being supplied with electric current by the fuel cell, the load or storage device not being damaged by this non-supply of electric current.

In particular, the prediction disclosed herein may be drawn up before the beginning of the phase of non-use of the motor vehicle. Advantageously, a user or a third party may adopt countermeasures (for example, seek out a filling station) prior to the parking of the motor vehicle. Advantageously, the value predicted before the phase of non-use can be updated continuously and/or periodically and/or in event-triggered manner during the phase of non-use, for instance before or during or after a fuel-consuming self-sufficient mode during non-use.

The technology disclosed herein further relates to a motor vehicle with the fuel-cell system disclosed herein. The motor vehicle, in particular the fuel-cell system, has been set up to execute the method disclosed herein.

The fuel-cell system disclosed herein includes at least one fuel cell. The fuel-cell system may serve, in particular, for the provision of energy for at least one propulsion engine for the locomotion of the motor vehicle. In its simplest form, a fuel cell is an electrochemical energy-converter that converts fuel (for example, hydrogen) and oxidizing agents (for example, air, oxygen and peroxides) into reaction products, and in the process produces electricity and heat. A fuel-cell system includes, in addition to the at least one fuel cell, peripheral system components (BOP components) which may come into action in the course of the operation of at least one fuel cell. As a rule, several fuel cells have been combined to form a fuel-cell stack (or just "stack"). The fuel-cell system includes an anode subsystem which is formed by the fuel-conducting structural elements of the fuel-cell system. The main task of the anode subsystem is the introduction and distribution of fuel to the electrochemically active surfaces of the anode compartment, and the removal of anode waste gas. The anode subsystem may include at least one pressure-reducer, at least one anode feed line leading to the anode inlet, an anode compartment in the fuel-cell stack, and a pressure-vessel system with at least one pressure vessel and with at least one tank shut-off valve.

The fuel-cell system includes at least one control unit which has been set up to regulate or to control the method disclosed herein.

The pressure-vessel system serves for storing fuel that is gaseous under ambient conditions. The pressure-vessel system can be employed, for instance, in a motor vehicle that is operated with compressed natural gas (CNG) or liquefied natural gas (LNG) or with hydrogen. Such a pressure-vessel system comprises at least one pressure vessel and at least one tank shut-off valve. The pressure vessel may be, for instance, a cryogenic pressure vessel (=CcH2) or a high-pressure gas vessel (=CGH2). High-pressure gas vessels are designed to store fuel permanently substantially at ambient temperatures at a nominal operating pressure (also called nominal working pressure or NWP) of about 350 bar of gauge pressure (=excess pressure over atmospheric pressure), more preferably of about 700 bar of gauge pressure or more. A cryogenic pressure vessel is suitable to store the fuel at the aforementioned operating pressures even at temperatures that lie distinctly below the operating temperature of the motor vehicle.

The tank shut-off valve of the pressure-vessel system is the valve having an inlet pressure that (substantially) corresponds to the pressure of the vessel. The tank shut-off valve is, in particular, a controllable or adjustable—and, in particular, normally closed—valve. The tank shut-off valve has, as a rule, been integrated into an on-tank valve (=OTV). The on-tank valve is the valve unit mounted directly at one end of the pressure vessel and in direct fluidic communication with the interior of the pressure vessel. In Commission Regulation (EU) No. 406/2010 of 26 Apr. 2010 for implementing Regulation (EC) No. 79/2009 of the European Parliament and of the Council on type-approval of hydrogen-powered motor vehicles, such a tank shut-off valve is also designated as the first valve. In the case of pressure-vessel systems with several pressure vessels there may be provision that such a tank shut-off valve is provided on each pressure vessel, or that a tank shut-off valve is provided in a common anode feed line.

In particular, the motor vehicle disclosed herein can be described by the following aspects:

1. A motor vehicle with a fuel-cell system, wherein the fuel-cell system has been set up to ascertain or to predict the indication value that is indicative of the real and/or possible mass flow of the withdrawal of fuel from a pressure-vessel system of the motor vehicle; and wherein the fuel-cell system may have been set up to close at least one tank shut-off valve when the indication value is equal to or falls short of the limiting value disclosed herein.

2. The motor vehicle according to aspect 1, wherein the limiting value of non-use is lower than the limiting value of use of the motor vehicle.

3. The motor vehicle according to aspect 1 or 2, wherein the fuel-cell system has been set up to ascertain the indication value on the basis of:

the fuel pressure in the pressure-vessel system;
the change of density in the pressure-vessel system; and/or
the electrical power of the fuel-cell system.

4. The motor vehicle according to one of the preceding aspects, wherein the fuel-cell system has been set up to predict the indication value.

5. The motor vehicle according to claim 4, wherein the prediction is made by taking into consideration: a) the exchange of heat between at least one pressure vessel of the pressure-vessel system and the environment during the phase of non-use; and/or b) the predicted consumption of fuel during the phase of non-use.

6. The motor vehicle according to aspect 4 or 5, wherein the fuel-cell system has been set up to output an item of information to the user of the vehicle and/or to a third party if the ascertained and/or predicted indication value lies below the limiting value of non-use.

7. The motor vehicle according to one of aspects 4 to 6, wherein the fuel-cell system has been set up to deactivate the at least one fuel-consuming function of the motor vehicle during the non-use of the motor vehicle if the ascertained and/or predicted indication value lies below the limiting value of non-use or is approaching the limiting value of non-use.

8. The motor vehicle according to one of aspects 4 to 6, wherein the prediction is drawn up before the beginning of the phase of non-use.

In other words, for certain functions of the fuel-cell system during parking the withdrawal of fuel can be enabled despite withdrawal switch-off thresholds (=limiting values) pertaining to the pressure vessel. For this purpose, the tank valve can be opened, or alternatively a bypass, parallel to the tank valve, and/or a pilot valve of the tank shut-off valve. In particular for this purpose, a valve and/or a bypass valve can be employed such as is disclosed in the German patent application having application number DE 10 2016 215 323. The valve and the bypass valve are hereby incorporated into this disclosure by reference.

The perception underlying the disclosure is that the mass flows of fuel that arise during parking—in order, for example, to enable the purge processes, the pressurizing of the stack and other fuel-cell functions at a standstill (parking)—are, as a rule, comparatively slight. According to the technology disclosed herein, the withdrawal switch-off thresholds that are applicable to the journey are lowered. Accordingly, different withdrawal switch-off thresholds or limiting values apply during parking.

Preferably, a calculation or forecast of the possible functions can be made in a manner depending on the pressure-vessel content (as a rule, the pressure is drawn upon) at the time of parking, and on the evolution of pressure in the pressure vessel during parking (depending on the evolution of the external temperature and on the consumption to be expected). Should certain functions be unavailable or only available to a limited extent (in number and functional scope), the driver (or a service station) can be informed, in order to draw attention to the deficit (functional restrictions, for example no self-sufficient mode) or the consequences (for example, fuel is insufficient to condition the fuel-cell system for the cold parking, to pressurize the anode, and/or to reach the nearest filling station after parking). The technology disclosed herein enables a pressure vessel to open for normal operation of the motor vehicle despite existing switch-off thresholds. For instance, the charging of a high-voltage storage device can be prevented if the latter reaches an impermissibly low degree of filling during parking (for example, on account of depletion of the on-board power supply, or lowering of the temperature). Although such a low degree of filling is undesirable, it causes no or little irreversible harm, which is more readily acceptable with regard to possible damage to the fuel-cell system.

Other objects, advantages and novel features of the present invention will become apparent from the following detailed description of one or more preferred embodiments when considered in conjunction with the accompanying drawing.

BRIEF DESCRIPTION OF THE DRAWING

The FIGURE shows a schematic flowchart of the technology disclosed herein.

DETAILED DESCRIPTION OF THE DRAWING

The method starts with step S100. In step S200 the control unit of the fuel-cell system checks whether the motor vehicle is currently parked or a parking event will follow. In step S300 the indication value is determined or predicted for this phase of non-use. For this purpose, the quantities constituted by pressure and temperature of the fuel in the pressure vessel are ascertained, for instance, and the indication value is derived from these quantities. If, for instance, it is planned that the motor vehicle will be parked overnight, the impending changes of pressure and temperature in the pressure vessel can be approximated on the basis of the instantaneous temperature of the fuel, or of the pressure vessel, and the external temperature. Associated with these approximated values of pressure and temperature is a value (an indication value) of the withdrawal mass flow that the pressure-vessel system of the fuel-cell system is able to provide to the fuel-cell stack. For instance, for this purpose a characteristic map in which a corresponding (indication) value has been assigned to the various values of pressure and temperature may have been saved in a control unit.

In step S400 the control unit checks whether the indication value is or will be less than or equal to the limiting value of non-use. If this is the case, the motor vehicle informs the user or third parties about it (cf. step S610). The item of information may expediently contain an action instruction such as, for instance, "Please refuel motor vehicle before parking". In step S612 it is established that the fuel-cell system may be operated only in the reduced self-sufficient mode during the non-use of the motor vehicle. In this reduced self-sufficient mode, merely the fuel-consuming protective functions are executed. The other fuel-consuming functions are deactivated, in order to reduce the consumption of fuel.

If it is established in step S400 that the indication value is greater than the limiting value of non-use, in step S500 it can be checked whether a reduction of the electrical load is advisable. This may be the case, for instance, if the indication value is only slightly greater than the limiting value of non-use, for instance only by 5% or 10% or 20%. If this is established, an item of information can likewise be output to the user or to third parties, in which attention is drawn to the fact that, for instance, certain comfort functions for protecting the fuel-cell system are not being carried out (cf. step S510). In this case, a reduced self-sufficient mode may have been provided, in which, for instance, certain comfort functions (for example, preconditioning of the passenger compartment of the vehicle) are not activated (cf. step 512).

If it is established in step S500 that a reduction of the load is not required, in step S530 the self-sufficient operation with all the protective functions, comfort functions and conditioning functions can take place in its full scope. The method sequence shown here is preferably repeated up until the next use of the motor vehicle.

The flowchart disclosed herein represents one configuration. Of course, not all steps need to have been provided. For instance, the item of information to the user or to third parties (cf. S510, S610) and/or the reduction of the electrical load and the checking thereof (cf. S500, S510, S512) may also be dispensed with.

The technology disclosed herein relates to a method and also to a motor vehicle itself. All the features that have been disclosed in connection with the method are, so to speak, applicable to the structural features of the motor vehicle. Equally, the disclosed structural features relate, so to speak, to the method disclosed herein. The method disclosed herein and the motor vehicle disclosed herein can be employed predictively before the beginning of a phase of non-use and/or during a phase of non-use.

For reasons of readability, in simplifying manner the expression "at least one" has been omitted in some cases. To the extent that a feature of the technology disclosed herein has been described in the singular or indeterminately (for example, the/a fuel cell, the/a fuel-cell system, the/an indication value, the/a mass flow of the withdrawal of fuel, the/a pressure vessel, the/a tank shut-off valve, the/a limiting value, the/a limiting value of non-use, the/a limiting value of use, etc.), at the same time, the plurality thereof is also intended to have been disclosed concomitantly (for example, the at least one fuel cell, the at least one fuel-cell system, the at least one indication value, the at least one mass flow of the withdrawal of fuel, the at least one pressure vessel, the at least one tank shut-off valve, the at least one limiting value, the at least one limiting value of non-use, the at least one limiting value of use, etc.).

The foregoing description of the present invention serves only for illustrative purposes and not for the purpose of restricting the invention. Within the context of the invention, various amendments and modifications are possible without departing from the scope of the invention and its equivalents, therefore, the invention should be construed to include everything within the scope of the appended claims and equivalents thereof.

What is claimed is:

1. A method for supplying a fuel cell of a fuel-cell system of a motor vehicle with fuel, comprising the act of:
   ascertaining or predicting an indication value that is indicative of a real and/or a possible mass flow of a withdrawal of fuel from a pressure-vessel system of the motor vehicle;
   wherein a limiting value of the indication value during a phase of non-use of the motor vehicle is a limiting value of non-use, wherein the phase of non-use of the motor vehicle is an inactive phase of the motor vehicle during which the motor vehicle actively receives no instruction from a user of the motor vehicle that requires an operation of the fuel cell of the fuel-cell system of the motor vehicle or of the motor vehicle, wherein the limiting value of the indication value during a phase of use of the motor vehicle is a limiting value of use, and wherein the limiting value of non-use is lower than the limiting value of use.

2. The method as claimed in claim 1 further comprising the act of closing or keeping closed a tank shut-off valve when the indication value is equal to or falls short of the limiting value of non-use.

3. The method as claimed in claim 1, wherein the indication value is ascertained on a basis of:
   a fuel pressure in the pressure-vessel system;
   a change of density in the pressure-vessel system; and/or
   a power of the fuel cell that the fuel cell provides in operation.

4. The method as claimed in claim 1, wherein the indication value is predicted.

5. The method as claimed in claim 4, wherein the predicting is made by taking into consideration:
   an exchange of heat between a pressure vessel of the pressure-vessel system and the environment during the phase of non-use; and/or
   a predicted consumption of fuel during the phase of non-use.

6. The method as claimed in claim 1 further comprising the act of deactivating a fuel-consuming function of the motor vehicle during the phase of non-use of the motor vehicle if the indication value lies below the limiting value of non-use or is approaching the limiting value of non-use.

7. The method as claimed in claim 1 further comprising the act of outputting an item of information if the indication value is equal to or falls short of the limiting value of non-use.

8. The method as claimed in claim 1 further comprising the act of outputting an item of information to a user of the motor vehicle and/or to a third party if the indication value lies below the limiting value of non-use.

9. The method as claimed claim 1, wherein the prediction is made before a beginning of the phase of non-use.

10. The method as claimed in claim 1 further comprising the acts of:
    outputting an item of information during the phase of non-use when the indication value is less than or equal to the limiting value of non-use; and
    withdrawing fuel from the pressure-vessel system and supplying the withdrawn fuel to the fuel-cell system, or checking whether a reduction of electrical load of the motor vehicle is advisable, during the phase of non-use when the indication value is above the limiting value of non-use.

* * * * *